(12) United States Patent
Floyd

(10) Patent No.: US 6,485,074 B1
(45) Date of Patent: Nov. 26, 2002

(54) TOOL FOR HANDLING BARBECUE GRILLS

(76) Inventor: Robert E. Floyd, 208 Northern Trails Dr., Soddy Daisy, TN (US) 37379

( * ) Notice: Subject to any disclaimer, the term of this patent is extended or adjusted under 35 U.S.C. 154(b) by 0 days.

(21) Appl. No.: 10/084,751

(22) Filed: Feb. 26, 2002

(51) Int. Cl.$^7$ .................... A47J 45/10; F24B 15/00
(52) U.S. Cl. ................. 294/10; 7/109; 15/236.01; 294/2; 294/24
(58) Field of Search .............. 294/1.1, 2, 7, 9, 294/10, 12, 19.1, 24, 27.1, 50.6, 51, 55.5; 7/109, 110; 15/105, 236.01, 236.06–236.08; 30/169, 322; 431/345

(56) References Cited

U.S. PATENT DOCUMENTS

| | | | |
|---|---|---|---|
| 3,434,175 A | * | 3/1969 | Bray ..................... 294/7 X |
| 4,471,985 A | | 9/1984 | Mahoney |
| 4,844,525 A | * | 7/1989 | Tarlow et al. ......... 294/19.1 X |
| 5,616,022 A | * | 4/1997 | Moran .................... 431/345 X |
| D386,859 S | | 11/1997 | Rostron |
| D388,573 S | | 12/1997 | Rostron |
| 5,729,854 A | | 3/1998 | Powers |
| 6,000,739 A | * | 12/1999 | Zemit et al. ................... 294/9 |
| 6,039,372 A | * | 3/2000 | Noe et al. .................... 294/10 |

* cited by examiner

Primary Examiner—Johnny D. Cherry
(74) Attorney, Agent, or Firm—Donald R. Schoonover

(57) ABSTRACT

A tool includes an elongate body having a handle unit on one end and a grill contacting unit on another end. The grill contacting unit includes diverging tines with each having a beveled edge that may be scraped against a bar of a grill to clean that grill. A hollow tube is positioned in the grill contacting unit to contain a match that is used to ignite charcoals.

5 Claims, 3 Drawing Sheets

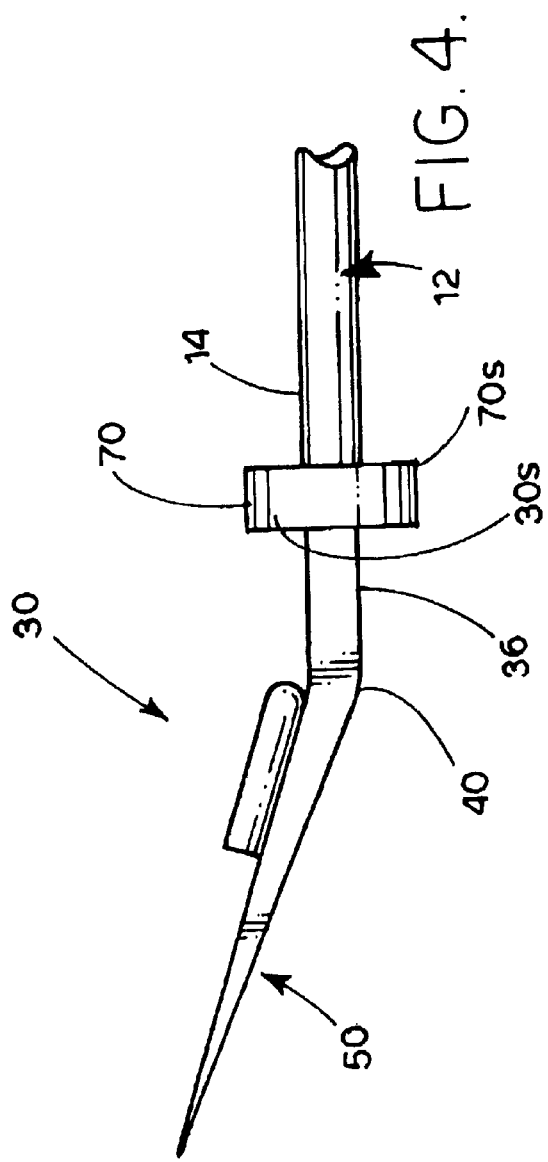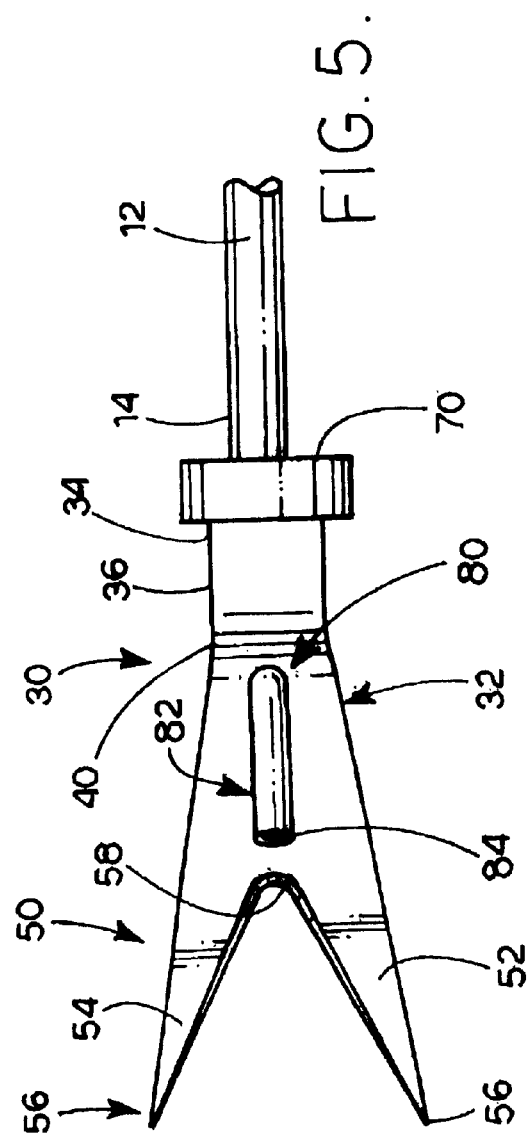

TOOL FOR HANDLING BARBECUE GRILLS

BACKGROUND OF THE INVENTION

1. Field of the Invention

The present invention relates to the general art of hand tools, and to the particular field of tools used in connection with barbecue grills.

2. Discussion of the Related Art

Many people enjoy barbecuing, and barbecuing can occur all year round and in many situations. While many people enjoy barbecuing, few people enjoy cleaning up a barbecue grill after use. Cleaning a barbecue grill often involves using a stiff-bristled brush and cleanser on the grill. This is a time consuming and unpleasant task.

Therefore, there is a need for a tool that can be used to efficiently and easily clean a barbecue grill.

However, making it easier to clean a grill of a barbecue unit is only part of a solution to making barbecuing more efficient and more pleasant. If the tool used to clean the grill is, itself, difficult to clean, then the advantages of the tool may be vitiated. If the tool is disposed of, cost concerns may also vitiate advantages of the tool.

Therefore, there is a need for a tool that can be used to clean a barbecue grill, but which, itself, can be easily cleaned.

Still further, after use, a barbecue grill is generally very hot and can be dangerous. In order to dispose of spent coals, the grill is often simply dumped off onto the ground. This is not a sanitary practice nor is it entirely safe.

Therefore, there is a need for a tool that can be used to handle a grill of a barbecue unit in a safe manner.

Still further, initially igniting the coals of a barbecue grill can be dangerous. The coals are generally soaked with an ignition fluid and an open flame applied to the coals. The ignition fluid often quickly flares up and then burns until the coals are ignited. If a user's hand is near the coals there may be a danger that the user's hand may be singed, or worse, when the coals are initially ignited.

Therefore, there is a need for a tool that can space a user's hand from the coals when the coals are being ignited.

Often, as the cooking is being carried out, the coals are rearranged. The rearrangement of coals keeps the fire hot and locates the heat in the most desired places to continue cooking food on the grill. However, at the present time, many people simply use a fork or a long stick to rearrange the coals. This may require the user to remove the grill which will be hot. However, even if the grill need not be removed, it is difficult to move hot coals around with a stick or the like.

Therefore, there is a need for a tool that will permit movement of ignited coals during a barbecuing process.

PRINCIPAL OBJECTS OF THE INVENTION

It is a main object of the present invention to provide a tool that can be used to efficiently and easily clean a barbecue grill.

It is another object of the present invention to provide a tool that can be used to handle a grill of a barbecue unit in a safe manner.

It is another object of the present invention to provide a tool that can space a user's hand from the coals when the coals are being ignited.

It is another object of the present invention to provide a tool that will permit movement of ignited coals during a barbecuing process.

It is a main object of the present invention to provide a tool that can be easily cleaned.

SUMMARY OF THE INVENTION

These, and other, objects are achieved by a tool that has an elongate body with a handle on one end and a grill contacting unit on the other end. The grill contacting unit includes two diverging tines with each including a beveled edge that can be scraped against a bar of a barbecue grill to clean that bar. The tool further includes a hollow tube near the base of the tines to contain a match. The match is releasably positioned in the hollow tube to have the head of the match located outside of the tube. Striking the head of the match ignites the match, and the match can then be placed next to igniter fluid-soaked charcoals to ignite those coals while the user holds the tool at the other end by a handle unit of the tool whereby the user's hand is spaced apart from the coals by the tool.

The grill contacting unit of the tool is in one plane and that plane is oriented to be oblique to a plane containing the elongated body of the tool whereby a grill can be easily manipulated by the tool.

The grill contacting unit of the tool is held on the elongate body by a friction fit that is enhanced by a stop ring. In this manner, the grill contacting unit can be removed and cleaned or the beveled edges sharpened as required. The serviced grill contacting unit can then be replaced for further use.

BRIEF DESCRIPTION OF THE DRAWINGS

FIG. 4 is a side elevational view of a grill contacting unit of the tool of the present invention.

FIG. 5 is a perspective view of the grill contacting unit of the tool of the present invention.

DETAILED DESCRIPTION OF THE INVENTION

Figure 1:
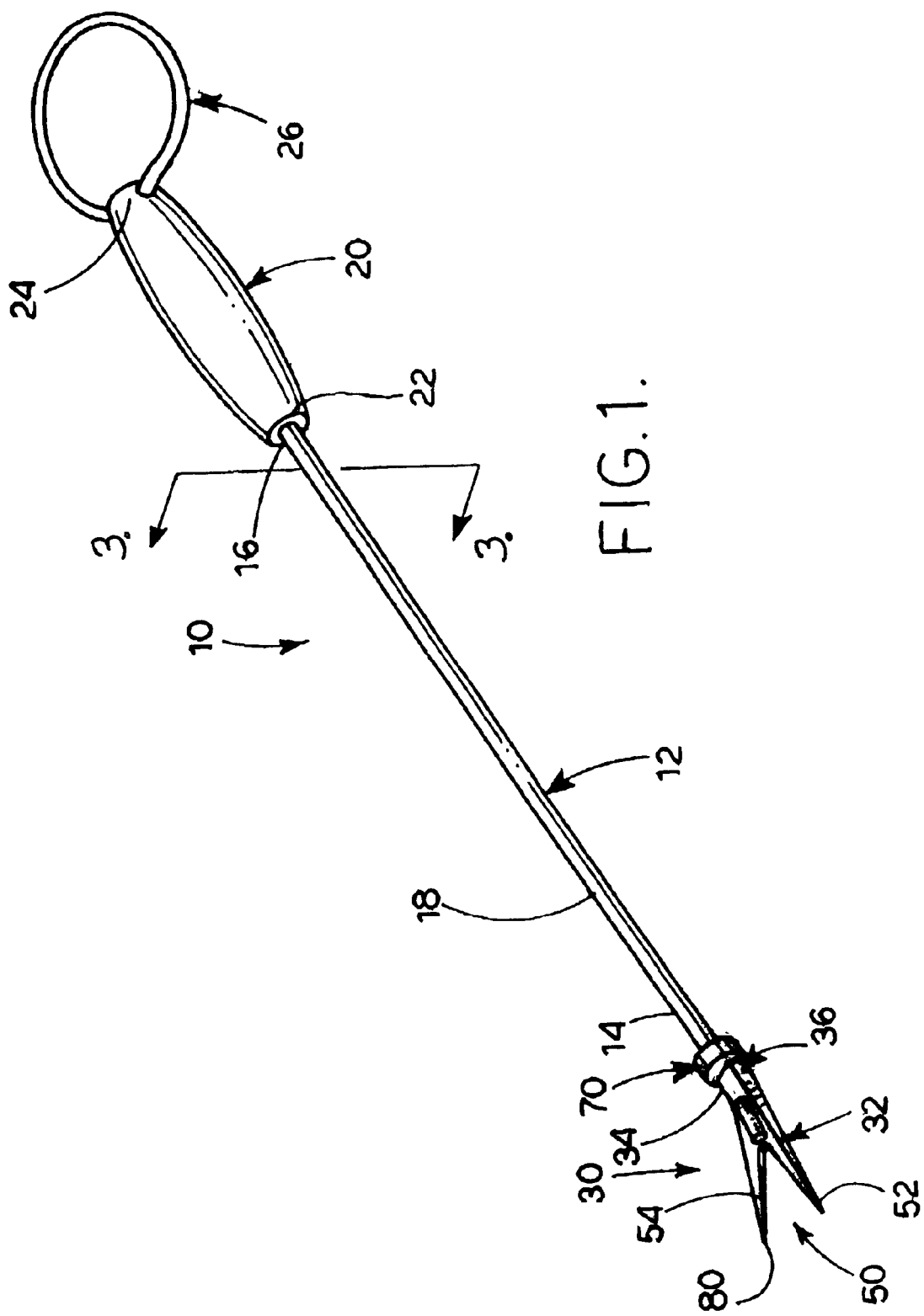
FIG. 1 is a perspective view of a hand tool embodying the present invention.
Figure 2:
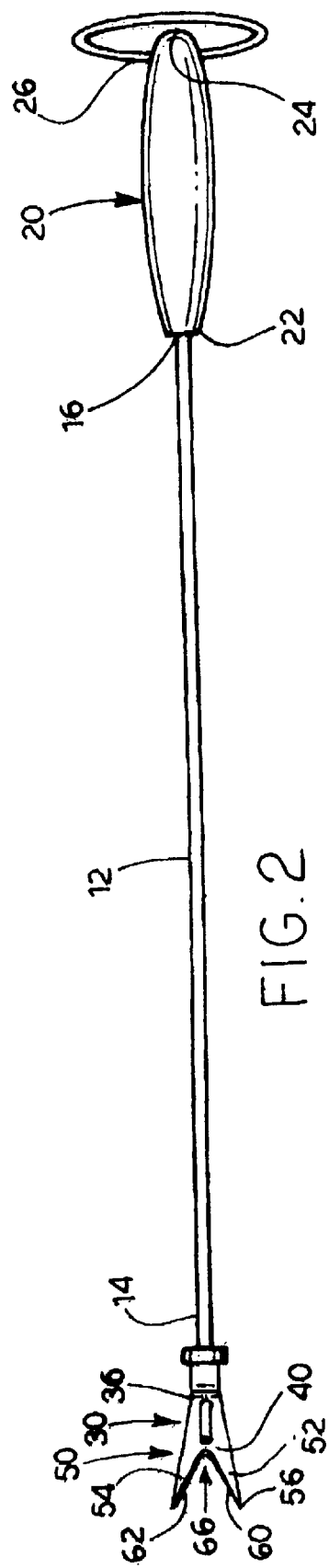
FIG. 2 is a top plan view of the tool embodying the present invention.

Other objects, features and advantages of the invention will become apparent from a consideration of the following detailed description and the accompanying drawings.

Shown in FIGS. 1–5 is a tool 10 for cleaning and handling a grill element of a barbecue unit comprising an elongate body 12 having a distal end 14, a proximal end 16 and a longitudinal centerline 18 extending between distal end 14 of elongate body 12 and proximal end 16 of elongate body 12. Body 12 is preferably formed of steel or the like so it can be used on a grill of a barbecue unit.

Tool 10 further includes a handle unit 20 fixed to proximal end 16 of elongate body 12. Handle unit 20 includes a proximal end 22 fixed to proximal end 16 of elongate body 12, a distal end 24, and a flexible strap 26 fixed to distal end 24 of handle unit 20. Handle unit 20 is shaped to fit comfortably into a user's hand and is generally constructed of wood or plastic or other suitable material. Flexible strap 26 is constructed of leather or the like and is used to hang tool 10 from a support when the tool is being stored.

Tool 10 further includes a grill contacting unit 30 releasably fixed to distal end 14 of elongate body 12 and includes a one-piece body 32 having a proximal end 34 fixed to distal end 14 of elongate body 12. One-piece body 32 of grill contacting unit 30 further includes an intermediate section 36 extending from the proximal end 14 of elongate body 12, with intermediate section 36 including a distal end 40 spaced from distal end 14 of elongate body 12.

One-piece body 32 further includes a V-shaped tine section 50 extending from intermediate section 36 of one-piece body 32 of grill contacting unit 30. V-shaped tine section 50 includes two tine elements 52 and 54 which are oriented at an oblique angle with respect to each other. Each tine element includes a tip, such as tip 56 of tine element 52 and a base, such as base 58 of tine element 54, with a beveled edge, such as beveled edge 60 of tine element 52 and beveled edge 62 of tine element 54, connecting tip 56 and base 58 of each tine element. The tips of the tine elements are spaced apart from each other and the tine elements converge toward each other and intersect each other to form an intersection 66 adjacent to distal end 40 of intermediate section 36 of the one-piece body 32 of grill contacting unit 30.

As shown in FIG. 4, tine elements 52 and 54 are oriented in a common plane, which common plane is oriented at an oblique angle with respect to a plane containing elongate body 12 and intermediate section 36 of one-piece body 32 of grill contacting unit 30. The oblique orientation of planes permits the grill contacting unit 30 to be placed in contact with the bars of a barbecue grill and then to lift the grill upwardly. The bars of the barbecue grill will fit between the tines of the grill contacting unit 30 and will be held there by friction. The beveled edges of the tines permit the tines to be used to clean a grill bar captured between the tines. The tool is simply moved back and forth along the grill bar to remove food or other debris located on the bars of the grill. Once the grill is cleaned, the tool is then used to lift the grill upwardly so the spent coals can be disposed of. The tool thus acts as a cleaning tool as well as a grill handling tool.

Figure 3:
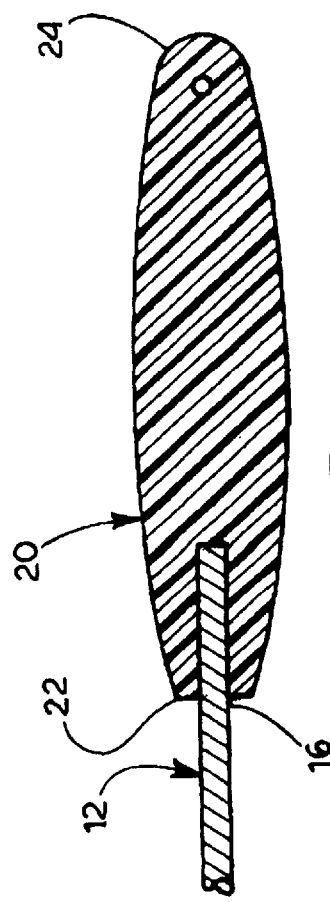
FIG. 3 is an elevational view of a handle unit of the tool of the present invention, taken along line 3—3 of FIG. 1.

A stop ring 70 attaches proximal end 34 of intermediate section 36 of one-piece body 32 of grill contacting unit 30 to distal end 14 of elongate body 12. As mentioned above, grill contacting unit 30 is releasably fixed to the elongate body. The handle unit 20 is also frictionally fixed to the elongate body 12 as indicated in FIG. 3. In a similar manner, grill contacting unit 30 is preferably fixed to the elongate body by friction. Since the grill contacting unit 30 will be used to lift a grill, or to move coals or the like, the friction fit between grill contacting unit 30 and elongate body 12 should be enhanced. Stop ring 70 achieves this goal by encircling grill contacting unit 30 and forcing that unit against the elongate body. Screw threads on the proximal end of the grill contacting unit 30 mate with screw threads on the stop ring 70 and the proximal end of the grill contacting unit 30 is tapered so that as the stop ring is threaded onto the grill contacting unit 30, that unit is forced against the elongate body 12. The mating screw threads are indicated in FIG. 4 by thread 30S on grill contacting unit 30 mating with thread 70S on stop ring 70. The grill contacting unit 30 and the stop ring 70 are formed of steel because these two units may be exposed to heat from a barbecue fire.

As is best shown in FIG. 5, a bore 80 is defined in intermediate section 36 of one-piece body 32 of grill contacting unit 30 to extend from adjacent to distal end 40 of intermediate section 36 to adjacent to proximal end 34 of intermediate section 36. A hollow tube 82 is located in bore 80 defined in intermediate section 36 of one-piece body 32 of grill contacting unit 30. Hollow tube 82 has an open end 84 located adjacent to distal end 40 of intermediate section 36 of one-piece body 32 of grill contacting unit 30.

A match, such as a wooden match, is releasably placed in the hollow tube with the head of the match located near distal end 40 so the match can be struck and will burn while being held in the tube and on the tool. In this way, the match can be placed near the charcoal to ignite that charcoal while the user holds the tool at the handle unit whereby the tool spaces the user's hand at a safe distance from the charcoal being ignited. Furthermore, if a user wishes to rearrange coals, he can simply slide tool 10 between the bars of the barbecue grill and use the grill contacting unit to rearrange the coals while his hand is spaced from the coals by the tool.

It is understood that while certain forms of the present invention have been illustrated and described herein, it is not to be limited to the specific forms or arrangements of parts described and shown.

I claim:

1. A tool for cleaning and handling a grill element of a barbecue unit comprising:
   a) an elongate body having
      (1) a distal end,
      (2) a proximal end, and
      (3) a longitudinal centerline extending between the distal end of said elongate body and the proximal end of said elongate body;
   b) a handle unit fixed to the proximal end of said elongate body and including
      (1) a proximal end fixed to the proximal end of said elongate body,
      (2) a distal end, and
      (3) a flexible strap fixed to the distal end of said handle unit; and
   c) a grill contacting unit fixed to the distal end of said elongate body and including
      (1) a one-piece body having
         (A) a proximal end fixed to the distal end of said elongate body,
         (B) an intermediate section extending from the proximal end of the one-piece body of said grill contacting unit and having a distal end spaced from the distal end of said elongate body and a proximal end connected to the distal end of said elongate body,
      (c) a V-shaped tine section extending from the intermediate section of the onepiece body of said grill contacting unit, the V-shaped tine section including
         (i) two tine elements which are oriented at an oblique angle with respect to each other,
         (ii) each tine element including a tip and a base with a beveled edge connecting the tip and the base of each tine element,
         (iii) the tips of the tine elements being spaced apart from each other and the tine elements converging toward each other and intersecting each other to form an intersection adjacent to the distal end of the intermediate section of the onepiece body of said grill contacting unit, and
         (iv) the tine elements being oriented in a common plane, which common plane is oriented at an oblique angle with respect to a plane containing said elongate body and the intermediate section of the onepiece body of said grill contacting unit,
      (2) a stop ring attaching the proximal end of the intermediate section of the one-piece body of said grill contacting unit to the distal end of said elongate body,
      (3) a bore defined in the intermediate section of the one-piece body of said grill contacting unit to extend from adjacent to the distal end of the intermediate section to adjacent to the proximal end of the intermediate section, and (4) a hollow tube located in the bore defined in the intermediate section of the one-piece body of said grill contacting unit, the hollow tube having an open end located adjacent to the distal end of the intermediate section of the one-piece body of said grill contacting unit.

2. A tool for cleaning and handling a grill element of a barbecue unit comprising:

a) an elongate body portion having a proximal end and a distal end;

b) a handle unit fixedly attached to the proximal end of said elongate body portion; and c) a grill contacting unit fixedly attached to the distal end of said elongate body portion and having (1) an intermediate body having a proximal end fixed to the distal end of said elongate body portion and a distal end spaced from the proximal end of the distal end of said elongate body portion, (2) two tines each having a proximal end at the distal end of the intermediate body of said grill contacting unit, each tine further having a tip end spaced from the tip end of the proximal end of the tine, the tip ends of the two tines being spaced apart from each other and the two tines converging toward each other from the tip ends to the proximal ends, each tine further having a beveled edge connecting the tip end thereof to the proximal end thereof, (3) the tines of said grill contacting unit being in a common plane, with the common plane containing the two tines of said grill contacting unit being oriented at an oblique angle with respect to a plane containing said elongate body portion, and (4) a hollow bore defined in the intermediate section and extending from adjacent to the distal end of the intermediate body to adjacent to the proximal end of the intermediate body, the hollow bore having an open end located adjacent to the distal end of the intermediate body.

3. The tool as described in claim 1 further including a match releasably contained in the hollow tube of said grill contacting unit.

4. The tool as described in claim 2 further including a connecting ring fixing said grill contacting unit to said elongate body portion.

5. The tool as described in claim 1 wherein said grill contacting unit is fixed to said elongate body by a friction fit.

* * * * *